United States Patent [19]

Nystuen et al.

[11] Patent Number: 4,628,733

[45] Date of Patent: Dec. 16, 1986

[54] METHOD AND APPARATUS FOR BALANCING A MOTOR-FAN SYSTEM

[75] Inventors: Arne M. Nystuen, Lincoln Township, Berrien County; John M. Kuss, St. Joseph Township, Berrien County, both of Mich.

[73] Assignee: Whirlpool Corporation, Benton Harbor, Mich.

[21] Appl. No.: 691,210

[22] Filed: Jan. 14, 1985

[51] Int. Cl.[4] .............................................. G01M 1/16
[52] U.S. Cl. ......................................... 73/462; 73/455; 310/42
[58] Field of Search ................... 73/66, 455, 460, 462, 73/473, 475, 476, 477, 478, 487; 248/674, 675; 310/42, 89, 91; 74/573 R

[56] References Cited

U.S. PATENT DOCUMENTS

| | | | |
|---|---|---|---|
| 1,588,205 | 6/1926 | Stephenson | 73/473 |
| 1,603,076 | 10/1926 | Hanson | 74/573 |
| 2,108,624 | 2/1938 | Thearle | 73/455 |
| 2,722,465 | 11/1955 | Ellis | 73/66 |
| 3,023,332 | 2/1962 | St. Charles | 310/254 |
| 3,854,339 | 12/1974 | Muller | 73/462 |
| 3,895,536 | 7/1975 | Behm | 73/462 |
| 4,079,275 | 3/1978 | Fu | 310/89 |
| 4,414,481 | 11/1983 | de Jong | 310/42 |

Primary Examiner—Stewart J. Levy
Assistant Examiner—John E. Chapman, Jr.
Attorney, Agent, or Firm—Wood, Dalton, Phillips, Mason & Rowe

[57] ABSTRACT

A method and apparatus for balancing of a motor armature and fan coupled thereto is disclosed. The apparatus includes a pair of spaced end brackets for supporting an armature of the motor and the fan for rotary movement. At least one motor bracket is coupled between the end brackets and includes means for detachably mounting a set of field coils for the motor thereon. The motor bracket further includes a recess therein which, when the set of field coils is detached from the motor bracket, exposes the armature to permit the armature and fan to be rotated as a unit so that the balance of the unit can be determined. The method and apparatus are particularly adavantageous for balancing a motor-fan system in which the motor is of the split-field coil type.

12 Claims, 5 Drawing Figures

METHOD AND APPARATUS FOR BALANCING A MOTOR-FAN SYSTEM

BACKGROUND OF THE INVENTION

1. Technical Field

The present invention relates generally to balancing techniques, and more particularly to a method and apparatus for balancing of a motor armature and fan coupled thereto.

2. Background Art

It has been found that the useful life of an apparatus having a rotating body is shortened if the body is unbalanced. For example, if either of an armature of a motor or a load driven thereby, such as a fan, is unbalanced, the armature will tend to vibrate the motor through the bearings in which it is supported, with the degree of vibration being dependent upon the magnitude of the unbalance. This vibration not only results in wear of the bearings but also increases the noise level and decreases the life of the motor.

Balancing systems have been devised which are useful to minimize the unbalance in a rotating part. An example of such a system is disclosed in Nystuen et al U.S. patent application Ser. No. 657,255, filed Oct. 3, 1984, entitled "Method of and Apparatus for Balancing a Rotary Body". The system disclosed therein includes means for supporting the rotating body in first and second spaced bearings and means for rotating the body in the bearings. Means are included for developing signals representing the forces in the first and second bearings during rotation of the body. These signals are coupled to a computer which includes means for summing the forces about a plane in which one of the bearings is disposed to determine the weight and location of a mass which, if added to or removed from the body, would substantially balance the body.

In the past, such balancing systems were utilized to balance individual motor armatures and loads. Each armature was then assembled into a motor and a load coupled thereto. The resulting motor and load system, however, was often poorly balanced even though the individual armature and load were balanced within specified limits due to the random selection and/or position of the assembled components. This poor overall balance, in turn, reduced the effectiveness of the balancing operation to a level which provided only a marginal increase in motor life.

SUMMARY OF THE INVENTION

In accordance with the present invention, a method and apparatus for balancing a motor which drives a load permits the motor and load to be balanced together as a unit so that forces caused by an unbalance condition are reduced to a minimum.

The apparatus of the present invention includes a pair of spaced end brackets for rotatably supporting an armature of the motor and a load connected thereto, such as a fan. At least one motor bracket is coupled to one or both of the end brackets and includes means for mounting a set of field coils for the motor. The motor bracket also includes a recess within which the armature resides, with a portion of the armature extending outwardly through an opening of the recess. When the set of field coils is removed from the motor bracket, the portion of the armature is exposed so that the armature and the fan may be rotated by the above-described balancing system. The degree of unbalance of the combined armature and fan can thereby be measured so that such forces can be compensated for, and hence minimized.

The balancing which can be achieved utilizing the method and apparatus of the present invention exceeds that which can be accomplished when individual rotating parts are balanced separately and then assembled. The useful life of a motor balanced in this fashion is thereby extended over those motors which have been balanced using prior methods.

The present invention is particularly advantageous for balancing motor-fan systems in which the motor is of the split-field coil type.

DESCRIPTION OF THE PREFERRED EMBODIMENT

Figure 1:
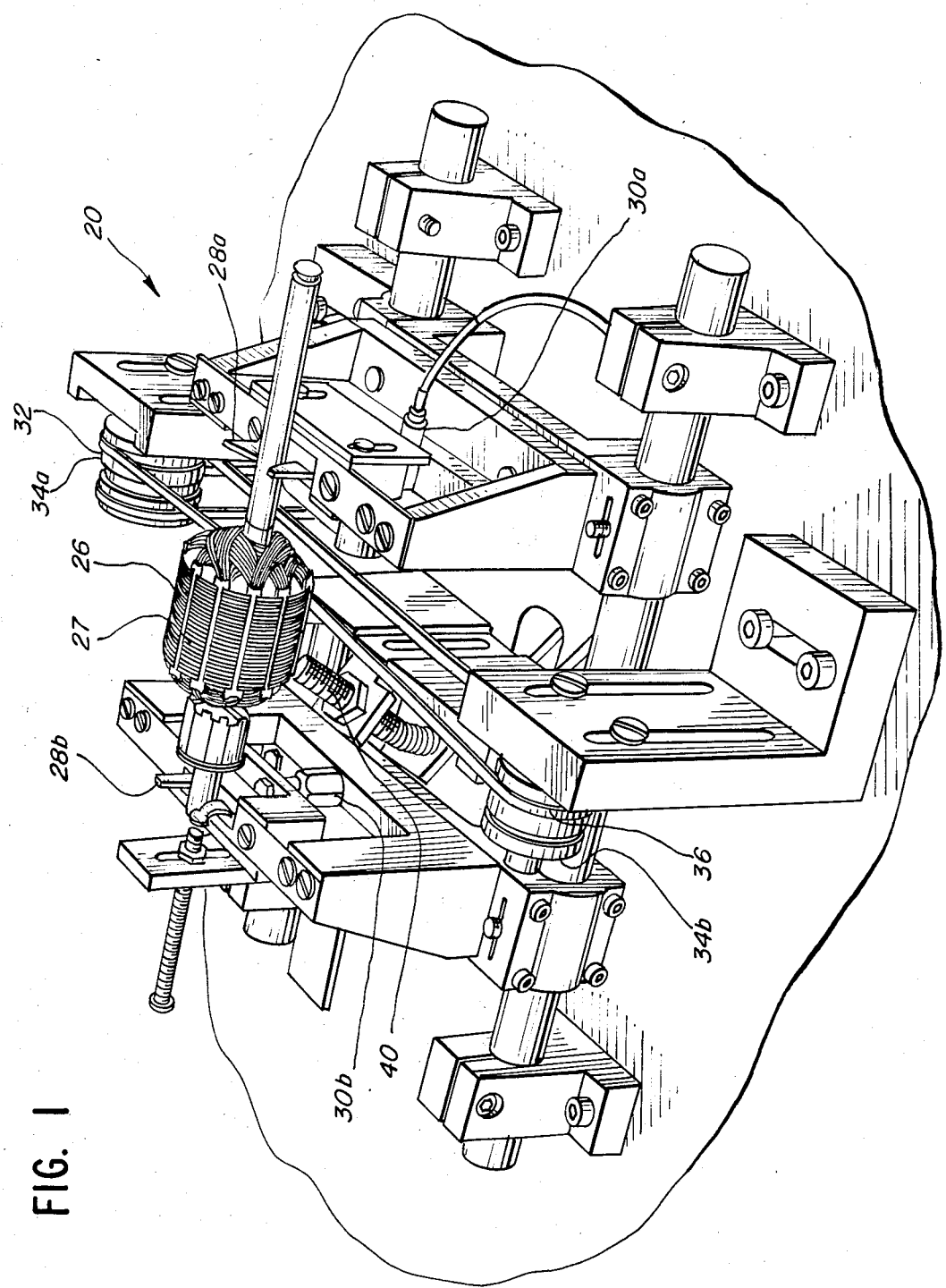
FIG. 1 is a perspective view of an unbalance detection unit in conjunction with a motor armature.

Referring now to FIG. 1, there is shown an unbalance detection unit 20 which is described with greater particularity in Nystuen et al U.S. patent application Ser. No. 657,255, filed Oct. 3, 1984, entitled "Method of and Apparatus for Balancing a Rotary Body", assigned to the assignee of the instant application and the disclosure of which is hereby incorporated by reference. The unbalance detection unit 20 is utilized to determine the degree of unbalance in a rotary part, such as, an armature 26. The unbalance detection unit 20 includes means for supporting the armature 26 at first and second bearing planes comprising first and second bearings 28a, 28b, respectively. Coupled to the bearings 28a, 28b are force transducers 30a, 30b, respectively, which develop signals representing the forces on the bearings. A friction drive 32 comprises means for rotating the armature 26 in the bearings 28. The friction drive 32 includes first and second idlers 34a, 34b and an elastomeric O-ring 36. The idlers 34 and O-ring 36 are in turn driven by a motor (not shown).

The O-ring 36 engages the armature 26 so that the motor rotates the armature in the bearings 28 at a predetermined speed.

An optical sensor 40 is disposed adjacent the armature 26 and is adapted to sense a paint mark applied to a coil lamination stack 27 of the armature 26. The optical sensor 40 is utilized to detect the angular position of the armature 26 during rotation and is also utilized to detect the speed of rotation of the armature 26 as it is driven by the motor.

The signals from the force transducers 30 and the optical sensor 40 are coupled to a computer (not shown) which computes the position and magnitude of a mass compensation which, if effected, would substantially dynamically and statically balance the rotating parts. Once the detection of the degree of unbalance has been effected, the armature 26 is transferred to an unbalance correction unit (not shown) which effects the necessary mass compensation for balancing the part.

For a more complete description of the above balancing apparatus, reference should be had to the above-identified patent application.

The armature shown in FIG. 1 is intended for use in a vacuum cleaner motor which drives a rotary load, such as a fan. In the past, the armature and fan were individually balanced and subsequently assembled together into a motor-fan system. However, on occasion the resulting motor-fan system as assembled would be poorly balanced due to the random positioning of individual fans with respect to the motor and/or due to the fact that any one of a number of different fans might be connected to a particular motor.

In order to overcome the above problem, the method and apparatus of the present invention is utilized whereby the armature and fan are coupled or assembled together as a motor-fan system or unit before balancing so that the unbalance in the system as a whole can be determined and thereafter reduced by appropriate mass compensation.

Figure 2:
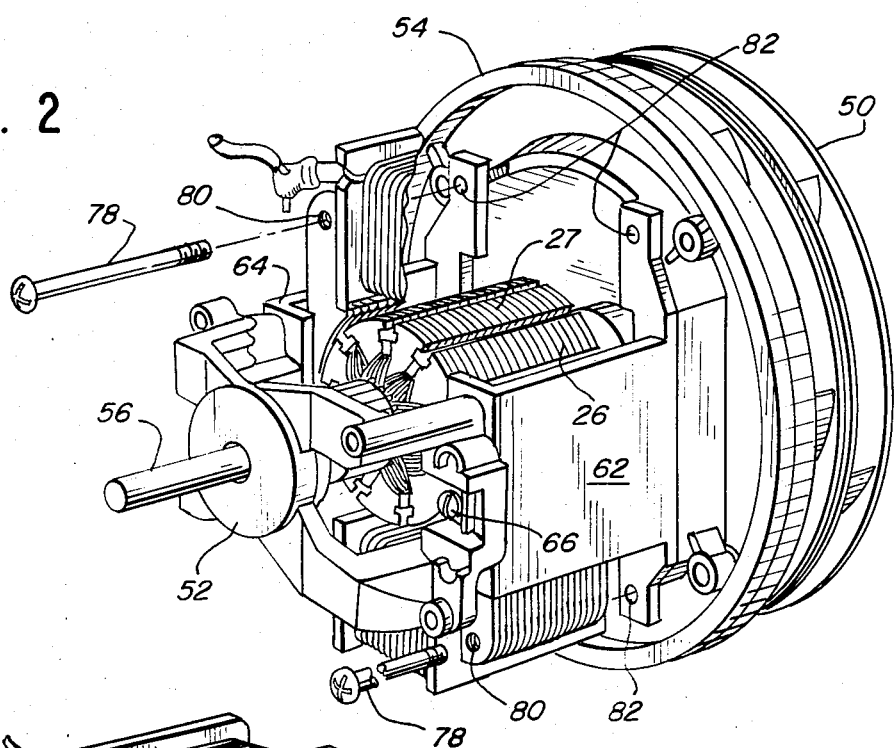
FIGS. 2 and 3 are exploded perspective views, with portions broken away in FIG. 2, of a motor armature and fan in conjunction with apparatus for supporting the armature and fan during balancing according to the present invention.
Figure 3:
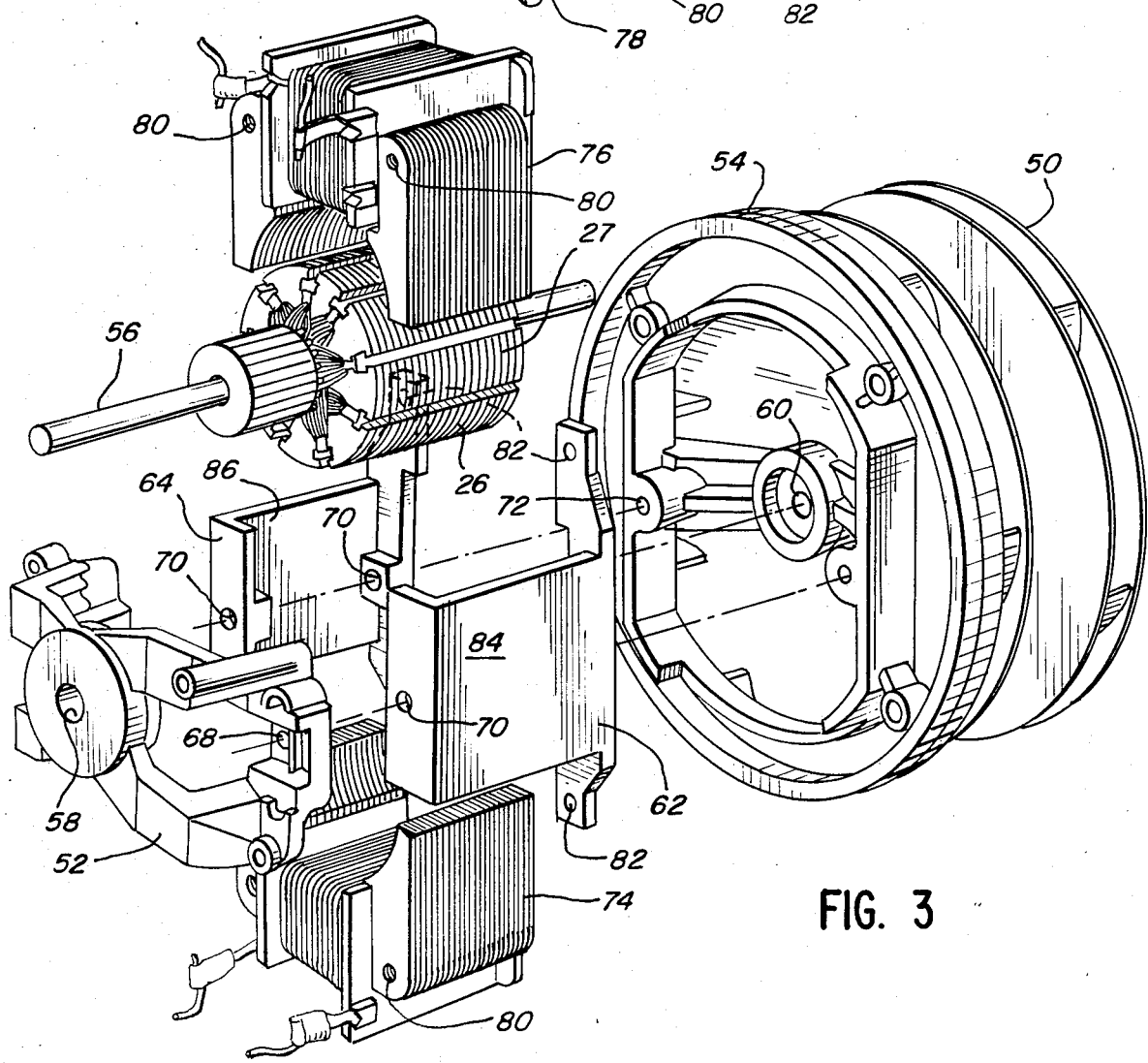

Referring now to FIGS. 2 and 3, there is illustrated apparatus for the motor armature 26 and a load coupled thereto, such as a fan 50, so that the degree of unbalance in the armature and fan as a unit can be determined. The apparatus includes a pair of spaced end brackets 52,54 which are also referred to as an armature bracket and a fan bracket, respectively. The motor armature 26 includes a shaft 56 having a first end which extends through a passage 58 formed in the armature bracket 52 and a second end which extends through a passage 60 formed in the fan bracket 54, the armature thereby being supported for rotary movement in the brackets 52,54. The fan 50 is secured to the second end of the shaft 56, so that the armature 26 and fan 50 can rotate together as a unit.

The end brackets 52,54 are maintained in a fixed spaced relationship by means of at least one and preferably two motor brackets 62,64 and screws 66 (only one of which is shown in the figures) which extend through aligned holes 68, 70,72 in the armature bracket 52, the motor brackets 62 or 64 and the fan bracket 54, respectively.

Each of the motor brackets 62,64 includes means for detachably mounting a set of field coils, shown as field coils for a motor of the split-field coil type, such as the coils 74,76 by means of screws 78 (only two of which are shown in FIG. 2). The screws 78 extend through aligned holes 80,82 in the field coils 74,76 and the motor brackets 62,64, respectively.

Figure 5:
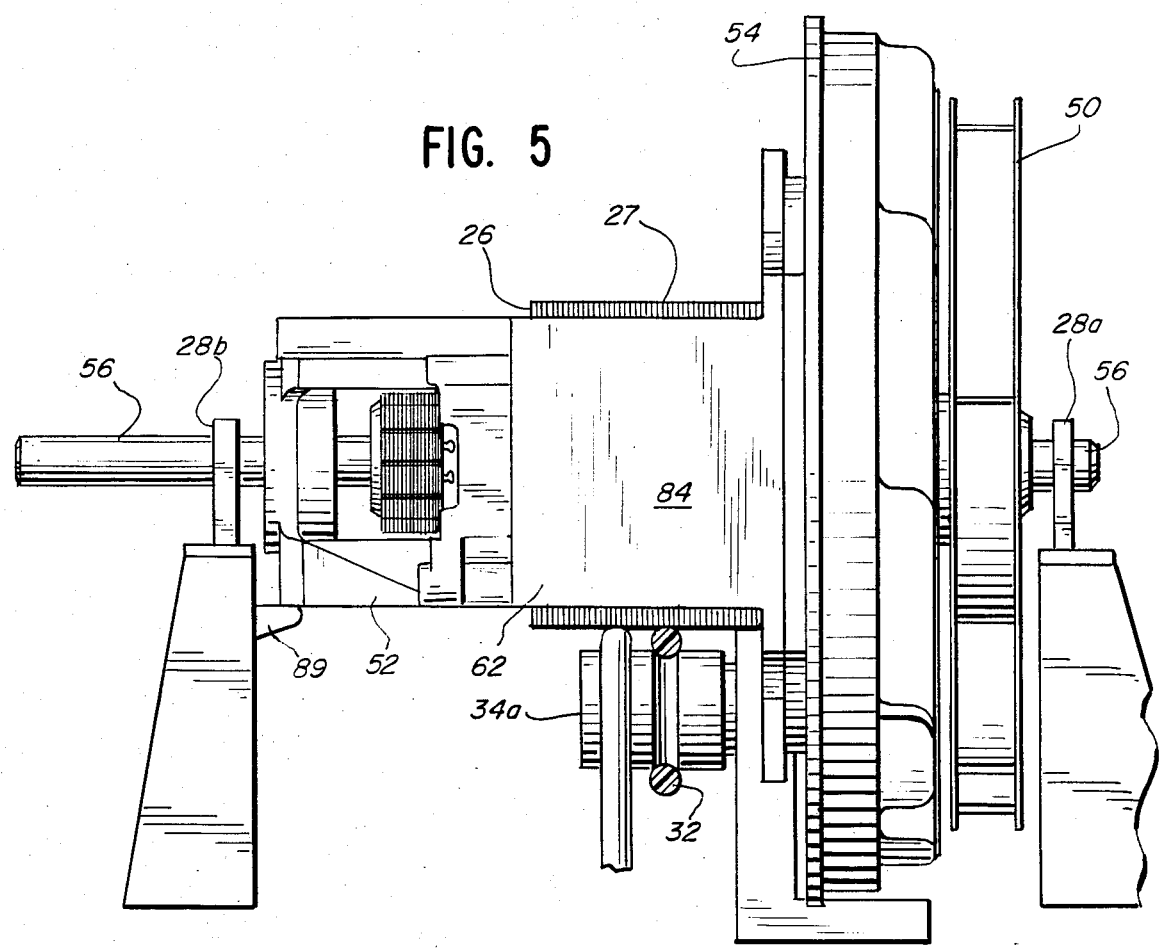
FIGS. 4 and 5 are plan and elevational views, respectively, of the apparatus shown in FIGS. 2 and 3 in conjunction with a portion of the unbalance detection unit shown in FIG. 1.
Figure 4:
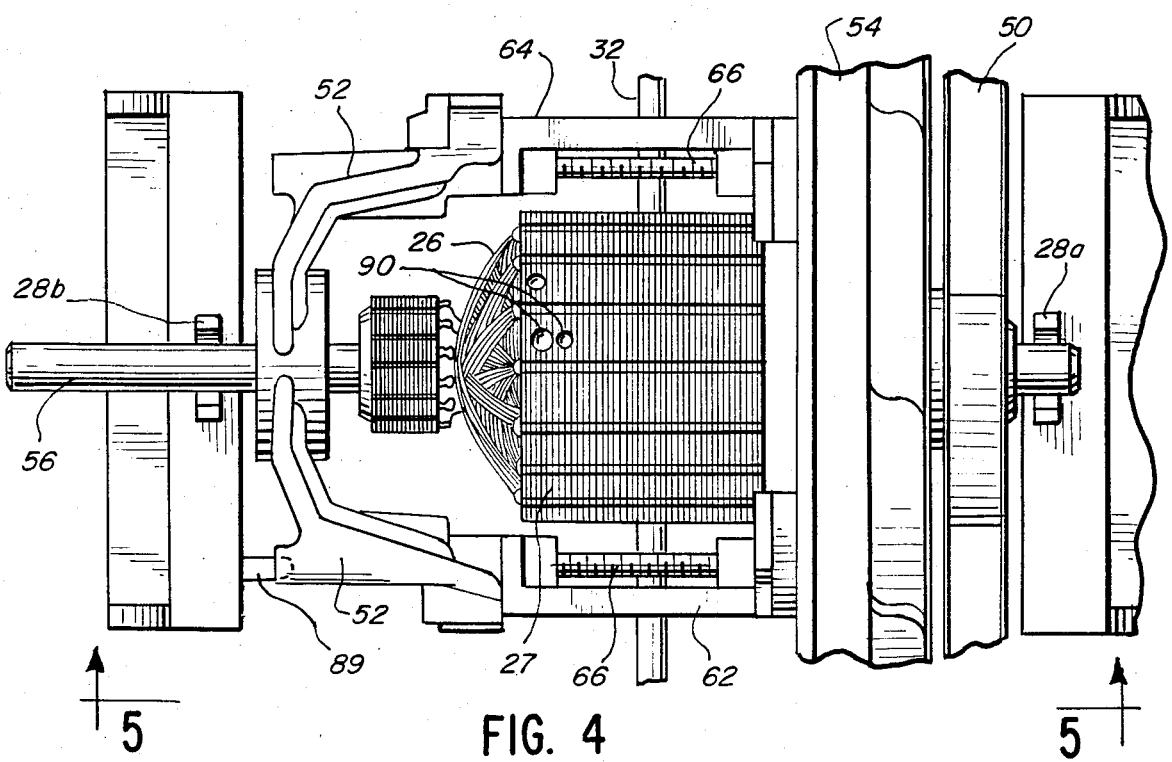

The motor brackets 62,64 include a recess therebetween within which the armature lamination stack 27 is disposed. The height of a main portion 84,86 of each motor bracket 62,64, respectively, is less than the diameter of the lamination stack 27 so that a portion of the stack 27 extends outwardly through an opening between the brackets 62,64. When one or both of the field coils 74,76 is detached from the motor brackets 62,64, the armature lamination stack is exposed so that it can be engaged by the friction drive 32, as seen in FIG. 5.

Once the armature has been assembled within the brackets 52,54,62,64 and the fan 50 secured thereto, and with one or both of the field coils 74,76 removed, so that the armature lamination stack 27 is exposed, the motor-fan system may then be placed in the bearings 28a,28b of the balance detection unit 20 shown in FIG. 1. Removal of the field coils is readily accomplished when the motor is of the split-field coil type as disclosed herein. The armature lamination stack 27 may then be engaged by the friction drive 32 so that the armature and fan can be rotated to permit detection of the degree of unbalance in the system or unit as a whole. Should an unbalance condition be sensed mass compensation can be effected directly on any member of the rotating system including but not limited to the lamination stack 27 or the fan 50, such as by drilling or otherwise removing material 90.

The illustrated structure includes means to prevent rotation of the motor brackets 62,64 while the armature and fan are being rotated by the unbalance detection unit in the form of a dog or the like 89 which may be affixed to the support for bearing 28b.

Once the balancing operation has been effected, the field coil windings 74,76 may be secured to the motor brackets 62,64 over the recess therein and electrical connections made thereto. The motor can then be assembled in a housing or other enclosure, as desired.

It should be noted that the motor brackets 62,64 could be integral with either the commutator bracket 52 or the fan bracket 54, if desired. Further, the two motor brackets 62,64 may be replaced by a single motor bracket, providing that the bracket includes a recess having an opening through which the armature lamination stack or other armature portion extends to permit driving thereof by the friction drive 32.

It should also be noted that the present invention may be employed with support of both armature bracket 52 and fan bracket 54 from directly below the brackets, as opposed to the illustrated arrangement in which the armature shaft 56 is supported by the bearings 28a and 28b, or a combination of support of the armature shaft by a bearing on one end and support on the opposite end from below either the bracket 52 or 54, as the installation may require.

The instant invention therefore permits a motor and load connected thereto to be balanced as a unit, thereby reducing vibration of the motor which can shorten its life.

We claim:

1. Apparatus for detecting the degree of unbalance of a motor-fan system including a motor armature having a shaft and a fan fixed to the shaft of the armature, comprising:

a pair of spaced end brackets for rotatably supporting the armature shaft;

at least one motor bracket disposed between the end brackets including means for detachably mounting a set of field coils for the motor thereon, the motor bracket further including a recess therein having an opening which, when the set of field coils is detached from the motor bracket, exposes the armature; and an unbalance detection unit including a pair of spaced bearings for rotatably supporting the armature shaft, means extending into the recess and engaging the armature for rotating the motor-fan system and means coupled to the spaced bearings for sensing the forces transmitted thereto by rotation of the motor-fan system.

2. The apparatus of claim 1, wherein two motor brackets are secured the end brackets.

3. The apparatus of claim 2, wherein each motor bracket has a height less than the diameter of an armature lamination stack of the armature so that such stack extends outwardly through the opening.

4. The apparatus of claim 1, wherein the motor bracket is separate from the end brackets.

5. The apparatus of claim 1, wherein the motor bracket is integral with one of the end brackets.

6. Apparatus for detecting the degree of unbalance of a motor-fan system including a motor armature having a shaft and a fan fixed to the shaft of the armature, comprising:
   a fan bracket;
   an armature bracket;
   the armature shaft being supported by the fan bracket and the armature bracket for rotary movement therein;
   a pair of motor brackets disposed between the fan and armature brackets having means for detachably mounting a set of field coils for the motor thereon, the motor brackets including a recess therebetween within which an armature lamination stack is disposed, wherein the lamination stack extends outwardly through an opening of the recess; and
   an unbalance detection unit including a pair of spaced bearings for rotatably supporting the armature shaft, means engaging the portion of the armature extending through the opening for rotating the motor-fan system and means coupled to the spaced bearings for sensing the forces transmitted by rotation of the motor-fan system.

7. The apparatus of claim 6, wherein wherein each motor bracket has a height less than the diameter of the lamination stack.

8. The apparatus of claim 6, wherein the motor bracket is separate from the end brackets.

9. The apparatus of claim 6, wherein the motor bracket is integral with one of the end brackets.

10. The apparatus of claim 6, wherein the motor is of the split-field coil type.

11. A method of detecting the degree of unbalance in a vacuum cleaner motor and a fan which is to be driven thereby utilizing an unbalance detection unit, the detection unit including a pair of spaced motor bearings for supporting an armature of the motor and means for rotating the armature in the motor bearings, the motor including a pair of spaced end brackets capable of supporting the motor armature for rotation therein and at least one motor bracket disposed between the end brackets having a recess within which the armature may be disposed and means for mounting a set of field windings over the recess, the method comprising the steps of:
   assembling the motor armature in the end brackets and the motor bracket so that a portion of the armature extends outwardly from the recess;
   securing the fan to the motor armature so that the fan and motor armature are rotatably supported as a unit by the brackets;
   placing the armature and fan unit in the spaced bearings; and
   engaging the portion of the armature extending out of the recess with the rotating means in the absence of the set of field windings so that the degree of unbalance of the armature and fan unit may be determined.

12. A method of detecting the degree of unbalance in a vacuum cleaner motor of the split-field coil type and a fan which is to be driven thereby utilizing an unbalance detection unit, the detection unit including a pair of spaced motor bearings for supporting an armature of the motor and means for rotating the armature in the motor bearings, the motor including a pair of spaced end brackets capable of supporting the motor armature for rotation therein and at least one motor bracket disposed between the end brackets having a recess within which the armature may be disposed and means for mounting a set of field windings over the recess, the method comprising the steps of:
   assembling the motor armature in the end brackets and the motor bracket in the absence of the field coil windings so that a portion of the armature extends outwardly from the recess so as to be readily accessible to said means for rotating the armature in the bearings;
   securing the fan to the motor armature so that the fan and motor armature are assembled together and rotatably supported as a unit by the brackets;
   placing the armature and fan unit in the spaced bearings; and
   engaging the portion of the armature extending out of the recess with the rotating means so that the degree of unbalance of the assembled armature and fan unit may be determined.

* * * * *